Patented Sept. 20, 1932

1,878,964

UNITED STATES PATENT OFFICE

WALTER MIEG, OF OPLADEN, NEAR COLOGNE, AND RUDOLF M. HEIDENREICH, OF LEVERKUSEN-ON-THE-RHINE, GERMANY, ASSIGNORS TO GENERAL ANILINE WORKS, INC., OF NEW YORK, N. Y., A CORPORATION OF DELAWARE

WATER SOLUBLE LEUCO ESTERS OF VAT DYESTUFFS

No Drawing. Application filed January 21, 1930, Serial No. 422,485, and in Germany January 24, 1929.

The present invention relates to a process of preparing water soluble leuco esters of vat dyestuffs, more particularly of anthroquinone-or indigoid vat dyestuffs, and to the new products obtainable by said process.

We have found that by reacting upon leuco derivatives of vat dyestuffs, more particularly anthraquinone- or indigoid vat dyestuffs, with a benzoic acid sulfo-halide in the presence of a tertiary heterocyclic base, such as pyridine, quinoline or the like, water soluble derivatives of the leuco compounds are obtainable, which in some cases form nearly colorless, in other cases strongly colored compounds. The new compounds are split up not only by acids, but likewise by alkalies, yielding in the latter case vats, which can be used directly for dyeing purposes. Applicants are not aware of the exact structure of the new compounds, but it may be mentioned that the ready solubility of the latter in water indicates, that in the reaction a rearrangement has occurred with the formation of carboxylic acid esters of the leuco vat dyestuffs containing free sulfonic acid groups.

The reaction is advantageously performed while first introducing the benzoic acid sulfo halide, such as benzoic acid meta- or para-sulfochloride, -bromide or the like, in the tertiary heterocyclic base, adding the leuco vat dyestuff and heating the mixture, preferably to a temperature between about 60-90° C., but it may be mentioned that, mainly depending from the kind of leuco vat dyestuff applied, also lower or higher temperatures will be operable. Therefore, the invention is not limited to the temperature ranges above mentioned. The reaction products separate from the reaction mixture and can be filtered and recrystallized from water. They are nearly insoluble in the usual organic solvents.

The best products in view of their solubility in water are obtained, while using at least two mols of the benzoic acid sulfo halide upon one mol of the leuco vat dyestuffs, as which latter the leuco derivatives of N-dihydro-1.2-2'.1'-anthraquinone azine, substitution products thereof, flavanthrone, anthanthrone, 2.7-dibromoanthanthrone, indigo, halogenated indigos, thioindigo, dimethoxydibenzanthrone (see Colour Index 1924, page 265, No. 1101) may be mentioned by way of example.

The invention is illustrated by the following examples, without being limited thereto:—

*Example 1.*— 2 parts by weight of benzoic acid meta-sulfo chloride are introduced into 6 parts by weight of dry pyridine and the mixture is heated to 50–70° C., whereupon complete solution occurs. From this solution a colorless compound of pyridine with the acid chloride separates on cooling. 1 part by weight of dry leuco thioindigo (obtainable by reducing thioindigo with an ammoniacal hydrosulfite solution in the presence of a small amount of alchohol) is introduced and the mixture is gradually heated to about 70° C. A solution is first produced, which on cooling solidifies to a magma of small colorless crystals of the ester, containing pyridine. This ester dissolves in water to a colorless solution and can be purified by recrystallization therefrom. On heating an aqueous alkaline solution of the ester saponification occurs with the formation of the yellow vat of thioindigo.

*Example 2.*—1 part by weight of N-dihydro-1.2.2'.1'-anthraquinone-azine is heated to about 70° C. in a mixture of 20 parts by weight of approximately 20% alcohol, 5 parts by weight of a 30% aqueous caustic soda solution and 1 part by weight of sodium hydrosulfite. After a temporary vat formation separation of small violet blue needles of the leuco compound occurs. These are filtered with suction, washed with hot dilute hydrochloric acid and dried in the absence of air. 3 parts by weight of this leuco compound are introduced into a cooled mixture of 4 parts by weight of benzoic acid meta-sulfo chloride and 40 parts by weight of pyridine (obtained in accordance with Example 1). The reaction mixture is gradually heated to 70–80° C. until a test portion dissolves completely in warm water with a reddish-violet coloration. On cooling of the reaction mixture, the ester separates out in form of a dark powder. It is soluble in water with a reddish-violet coloration and is split up by alkalies with the formation of a vat of N-dihydo-1.2.2'.1'-anthraquinone-azine.

*Example 3.*—A mixture, obtained in a manner analogous to that described in Example 1, of 30 parts by weight of the leuco compound of Caledone Jade Green (see Colour Index, 1924, page 265, No. 1101) with 35 parts by weight of benzoic acid meta-sulfo chloride and 180 parts by weight of pyridine is heated to 60-70° C. while stirring. The brownish-red solution, if necesssary after filtration, can be diluted with water and treated with sodium chloride to separate the ester. The leuco ester thus obtained dissolves in water with a brownish-red coloration. On heating this solution with an alkali in the absence of air saponification occurs with the formation of the blue colored vat of the starting dyestuff.

By replacing in the examples the benzoic acid meta-sulfo chloride by other benzoic acid sulfo halogenides such as benzoic acid para-sulfo chloride, meta- or para-benzoic acid, meta- or para-sulfo bromide or the like, compounds of similar properties are obtained.

We claim:

1. Process which comprises reacting upon a leuco derivative of a vat dyestuff of the group consisting of the anthraquinone- and indigoid vat dyestuffs with a benzoic acid sulfo halide in the presence of a tertiary heterocyclic base.

2. Process which comprises reacting upon one mol of a leuco derivative of a vat dyestuff of the group consisting of the anthraquinone- and indigoid vat dyestuffs with at least two mols of a benzoic acid sulfo halide in the presence of a teritary heterocyclic base.

3. Process which comprises reacting upon one mol of a leuco derivative of a vat dyestuff of the group consisting of the anthraquinone- and indigoid vat dyestuffs with at least two mols of a benzoic acid sulfo halide in the presence of pyridine.

4. Process which comprises reacting upon one mol of a leuco derivative of a vat dyestuff of the group consisting of the anthraquinone- and indigoid vat dyestuffs with at least two mols of a benzoic acid sulfo chloride in the presence of pyridine at a temperature of between about 60-90° C.

5. Process which comprises reacting upon leuco-1.2.2'.1'-dihydro-anthraquinone-azine with benzoic acid meta-sulfo chloride in the presence of pyridine and gradually heating the reaction mixture to about 70-80° C.

6. The new sulfonic acid phenyl carboxylic acid esters of the leuco derivatives of anthraquinoid and indigoid vat dyestuffs; obtainable by reacting upon the leuco derivative of a vat dyestuff of the group consisting of anthraquinone- and indigoid vat dyestuffs; with a benzoic acid sulfo halide in the presence of a tertiary heterocyclic base, said carboxylic acid esters forming nearly colorless to strongly colored compounds, soluble in water, nearly insoluble in the usual organic solvents, being split up to the leuco dyestuffs and a sulfo benzoic acid by alkalies and acids.

7. The new sulfonic acid phenyl carboxylic acid esters of the leuco derivatives of anthraquinoid and indigoid vat dyestuffs; obtainable by reacting upon one mol of the leuco derivative of a vat dyestuff of the group consisting of anthraquinone- and indigoid vat dyestuffs; with at least two mols of a benzoic acid sulfo halide in the presence of a tertiary heterocyclic base, said carboxylic acid esters forming nearly colorless to strongly colored compounds, soluble in water, nearly insoluble in the usual organic solvents, being split up to the leuco dyestuffs and a sulfo benzoic acid by alkalies and acids.

8. The new meta-sulfonic acid-phenyl carboxylic acid ester of the leuco compound of N-dihydro-1.2.2'.1'-anthraquinone-azine, obtainable by reacting upon one mol of leuco N-dihydro-1.2.2'.1'-anthraquinone-azine with at least two mols of benzoic acid m-sulfo chloride in the presence of pyridine, said ester being a dark powder soluble in water with a reddish violet coloration.

In testimony whereof, we affix our signatures.

WALTER MIEG.
RUDOLF M. HEIDENREICH.